(12) United States Patent
Wipasuramonton et al.

(10) Patent No.: US 9,937,890 B2
(45) Date of Patent: Apr. 10, 2018

(54) SIDE IMPACT AIRBAG MODULE

(71) Applicant: TK Holdings Inc., Auburn Hills, MI (US)

(72) Inventors: Pongdet Paul Wipasuramonton, Rochester, MI (US); Jonathan Richard Kibat, Warren, MI (US); Sung Woo Lee, Troy, MI (US); Alex Little, Auburn Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/757,434

(22) Filed: Dec. 23, 2015

(65) Prior Publication Data

US 2016/0185316 A1    Jun. 30, 2016

Related U.S. Application Data

(60) Provisional application No. 62/096,678, filed on Dec. 24, 2014.

(51) Int. Cl.
| | | |
|---|---|---|
| *B60R 21/233* | (2006.01) | |
| *B60R 21/2338* | (2011.01) | |
| *B60R 21/239* | (2006.01) | |
| *B60R 21/207* | (2006.01) | |

(Continued)

(52) U.S. Cl.
CPC ...... *B60R 21/23138* (2013.01); *B60R 21/207* (2013.01); *B60R 21/231* (2013.01); *B60R 21/233* (2013.01); *B60R 21/239* (2013.01); *B60R 21/2338* (2013.01); *B60R 2021/0006* (2013.01); *B60R 2021/23146* (2013.01);

(Continued)

(58) Field of Classification Search
CPC ............ B60R 21/23138; B60R 21/233; B60R 21/2338; B60R 21/239; B60R 21/207; B60R 21/231; B60R 2021/23146; B60R 2021/23308; B60R 2021/23324; B60R 2021/23382; B60R 2021/0006
USPC ........................ 280/729, 730.2, 743.1, 743.2
See application file for complete search history.

(56) References Cited

U.S. PATENT DOCUMENTS

| | | |
|---|---|---|
| 5,362,101 A | 11/1994 | Sugiura et al. |
| 6,883,832 B2 | 4/2005 | Keutz |
| 7,000,943 B2 | 2/2006 | Hasebe et al. |

(Continued)

FOREIGN PATENT DOCUMENTS

| | | |
|---|---|---|
| DE | 197 07 997 A1 | 9/1998 |
| DE | 10 2007 000 116 A1 | 10/2007 |

(Continued)

OTHER PUBLICATIONS

International Search Report dated Mar. 29, 2016 issued in PCT/US2015/000275; filed Dec. 23, 2015.

(Continued)

*Primary Examiner* — Keith J Frisby
(74) *Attorney, Agent, or Firm* — Gordon Rees Scully Mansukhani, LLP

(57) ABSTRACT

An airbag module for protecting an occupant of a vehicle seat. The module includes an inflatable airbag and an inflator. The airbag is stored in the vehicle seat prior to deployment and includes inboard and outboard inflatable chambers separated by a gap at a forward portion of the airbag. The airbag is configured to deploy into a position along side of the vehicle seat and the occupant.

17 Claims, 9 Drawing Sheets

(51) Int. Cl.
  *B60R 21/231* (2011.01)
  *B60R 21/00* (2006.01)
(52) U.S. Cl.
  CPC .............. *B60R 2021/23308* (2013.01); *B60R 2021/23324* (2013.01); *B60R 2021/23382* (2013.01)

(56) References Cited

U.S. PATENT DOCUMENTS

| | | |
|---|---|---|
| 7,121,584 B2 | 10/2006 | Hasebe et al. |
| 7,131,664 B1 | 11/2006 | Pang et al. |
| 7,192,053 B2 | 3/2007 | Thomas |
| 7,195,275 B2 * | 3/2007 | Abe .................... B60R 21/231 280/729 |
| 7,243,947 B2 | 7/2007 | Bosch |
| 7,255,367 B2 | 8/2007 | Bauer et al. |
| 7,316,416 B2 | 1/2008 | Hasebe et al. |
| 7,396,043 B2 | 7/2008 | Choi et al. |
| 7,458,605 B2 | 12/2008 | Hasebe et al. |
| 7,484,757 B2 | 2/2009 | Thomas et al. |
| 7,540,534 B2 | 6/2009 | Hasebe et al. |
| 7,584,994 B2 | 9/2009 | Narimoto et al. |
| 7,607,683 B2 | 10/2009 | Fischer et al. |
| 7,654,568 B2 | 2/2010 | Yamada |
| 7,712,769 B2 | 5/2010 | Hasebe et al. |
| 7,946,619 B2 | 5/2011 | Mendez |
| 8,297,649 B2 * | 10/2012 | Enders ................. B60R 21/231 280/729 |
| 2003/0006596 A1 | 1/2003 | Schneider et al. |
| 2003/0218325 A1 | 11/2003 | Hasebe et al. |
| 2004/0160048 A1 | 8/2004 | Hasebe et al. |
| 2004/0164526 A1 | 8/2004 | Hasebe et al. |
| 2004/0232681 A1 | 11/2004 | Adomeit |
| 2005/0212275 A1 | 9/2005 | Hasebe |
| 2006/0043707 A1 | 3/2006 | Hasebe et al. |
| 2006/0066089 A1 | 3/2006 | Hasebe et al. |
| 2006/0186647 A1 | 8/2006 | Bosch |
| 2006/0186648 A1 | 8/2006 | Bauer et al. |
| 2007/0108753 A1 | 5/2007 | Pang et al. |
| 2007/0205591 A1 | 9/2007 | Bito |
| 2007/0267856 A1 | 11/2007 | Schedler |
| 2008/0054613 A1 | 3/2008 | Narimoto et al. |
| 2008/0061536 A1 | 3/2008 | Hasebe et al. |
| 2011/0285119 A1 | 11/2011 | Yamamoto et al. |

FOREIGN PATENT DOCUMENTS

| | | |
|---|---|---|
| DE | 11 2006 000 409 T5 | 1/2008 |
| DE | 10 2009 007 394 A1 | 8/2009 |
| DE | 10 2008 018 627 B4 | 6/2015 |
| EP | 0861 762 A1 | 2/1998 |
| JP | 2006-062394 A | 9/2006 |
| JP | 2009-196631 A | 9/2009 |
| WO | WO 2005/097555 A1 | 10/2005 |
| WO | WO 2005-097555 A1 | 10/2005 |
| WO | WO 2006/089144 A1 | 8/2006 |

OTHER PUBLICATIONS

Written Opinion dated Mar. 29, 2016 Issued in PCT/US2015/000275; filed Dec. 23, 2015.

* cited by examiner

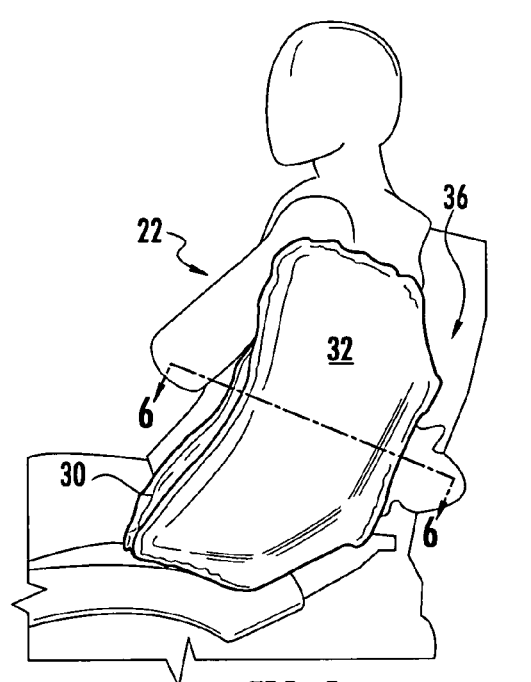 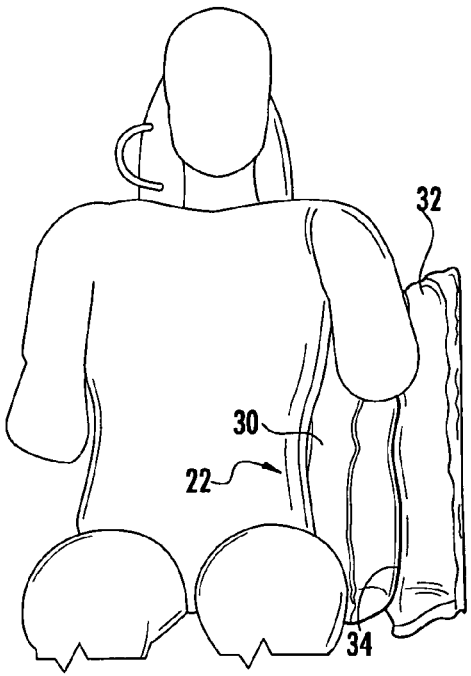
FIG. 3  FIG. 4
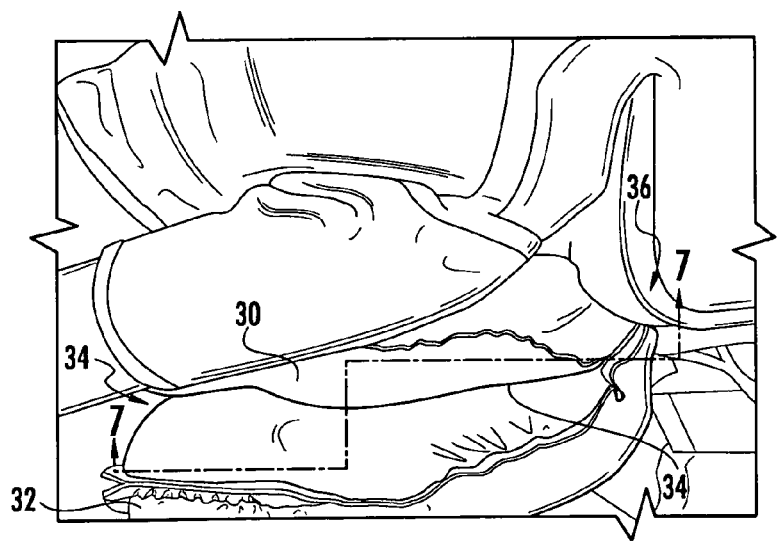
FIG. 5

SIDE IMPACT AIRBAG MODULE

CROSS REFERENCE TO RELATED APPLICATIONS

As shown in FIG. 19, the airbag 71 may include an internal tether 72. Although shown as a single panel 72, the tether may be formed by two separate panels. The tether 72 extends so that ends of the tether connect to the airbag at the base of the gap 77 between the lobes of the cushion. An intermediate portion of the tether 72 may be connected to the main panel proximate to the inflator. The airbag may also include patches to support the main panel in the area where the inflator connects to the main panel and the retainer. In addition, a heat shield 75 may be provided adjacent the inflator. FIGS. 20-23 show the assembly of the airbag, which is assembled in an "inside out" configuration as shown in FIGS. 20 and 21. The main panel is folded over and perimeter portions are connected together along a perimeter seam 81 as shown in FIG. 20. The panel is then folded (e.g., rolled) or bunched together to allow the ends of the tether 72 to be connected to the panel by a partially oval shaped seam 82. The seam passes through four layers of fabric (i.e., the tether 72 and the main panel 71).

BACKGROUND

The present application relates generally to the field of side impact airbags.

Side impact airbags (SAB) are deployed on the outboard side of a passenger of a vehicle to cushion the torso and/or head and/or pelvis of the passenger in a side impact event. Currently, there are two solutions for increasing effective loft, or thickness, in side airbags for improved energy management during a side impact event.

In standard fore/aft deploying two dimensional side airbags, the effective thickness of the airbag can be increased by increasing the overall perimeter area and thereby increasing the overall volume of the cushion. Also, the geometry of the airbag can be adjusted to increase the effective thickness by ensuring that the inflated airbag has a more spherical or cylindrical shape. The cross car width may be controlled, and/or limited by, the amount of vertical and forward shrinkage once the cushion is fully inflated. However, the increased volume of such an airbag requires a larger inflator output to achieve a desired pressure in the deployment window.

In other airbags, the perimeter seam of the airbag can be placed in the cross car direction to increase loft or thickness. This is an effective means of increasing the loft but in this case the forward coverage and cushion trajectory during deployment can be compromised since the SAB initially deploys laterally and forward trajectory is exclusively controlled by interaction with the environment in which it is deployed.

In both cases, energy during a vehicle side impact event is managed by cushion thickness and cushion pressure.

BRIEF DESCRIPTION OF THE DRAWINGS

Features, aspects, and advantages of the present invention will become apparent from the following description, appended claims, and the accompanying exemplary embodiments shown in the drawings, which are briefly described below.

FIG. 3 is a side view of a vehicle seat with the inflated airbag of FIG. 2.

FIG. 4 is a front view of a vehicle seat with the inflated airbag of FIG. 2.

FIG. 5 is a top view of a vehicle seat with the inflated airbag of FIG. 2.

DETAILED DESCRIPTION

Various features of the airbag module will be described with reference to the drawings. Like numbers are used throughout the drawings to refer to the same or similar parts and in each of the embodiments of the invention hereafter described.

Airbags may be provided at a variety of places within the vehicle to protect an occupant of the vehicle in a variety of impact scenarios. For example, airbags may be provided in the dashboard, proximate to the steering wheel, in the vehicle seats, in the door trim panels, in the headliner, etc.

Figure 1:
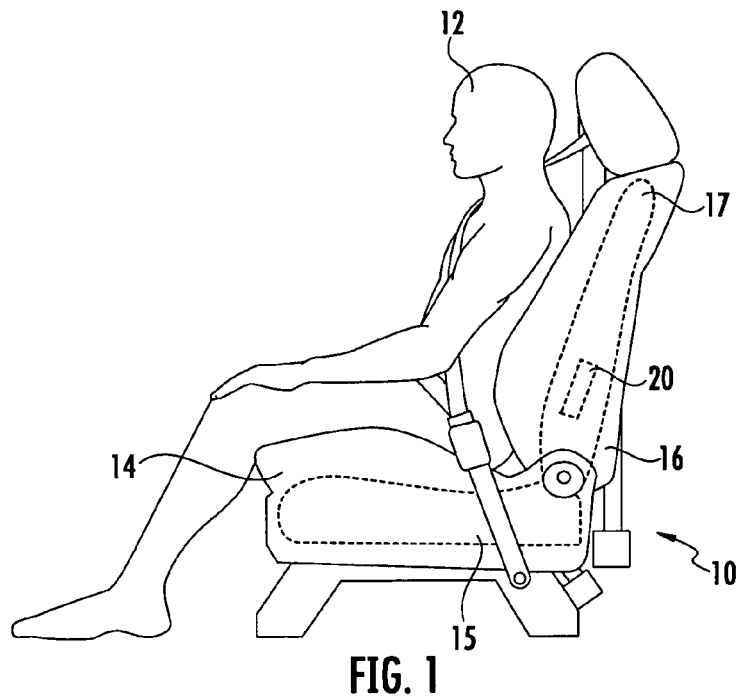
FIG. 1 is a schematic side view of a vehicle seat including a side impact airbag module.

Referring to FIG. 1, a vehicle seat 10 for a vehicle is shown with an occupant 12. The vehicle seat 10 includes a generally horizontal lower portion or seat bottom 14 with a seat bottom frame 15 and an upper portion or seat back 16 with a seat back frame 17. The seat bottom 14 is coupled to the vehicle and the seat back 16 extends upward from the rear end of the seat bottom 14. Each of the seat bottom 14 and the seat back 16 include a cushion such as a foam pad that is coupled to the frame, and a trim cover that surrounds the cushion.

According to an exemplary embodiment, a side airbag (SAB) module 20 is provided in the vehicle seat 10. The SAB module 20 may be provided that is configured to protect an occupant of the vehicle in a side impact or rollover event. In an exemplary embodiment, the SAB module 20 is located in the seat back 16 along the outboard side of the vehicle seat 10. The SAB module 20 is configured to deploy an airbag in order to absorb energy between the occupant and the trim and/or limit the cross-car (e.g., lateral, side-to-side) movement of the occupant 12 in a side impact event. While the SAB module 20 is generally shown as being configured for a driver side passenger, the SAB module 20 may be used in both driver side and passenger side configurations. The SAB module 20 may be used to provide protection to any occupant located in any seating row (e.g., first, second, third) of a passenger compartment of a vehicle. In other embodiments, the SAB module 20 may be deployed from another structure of the passenger compartment, such as the door panel or pillar.

Figure 2:
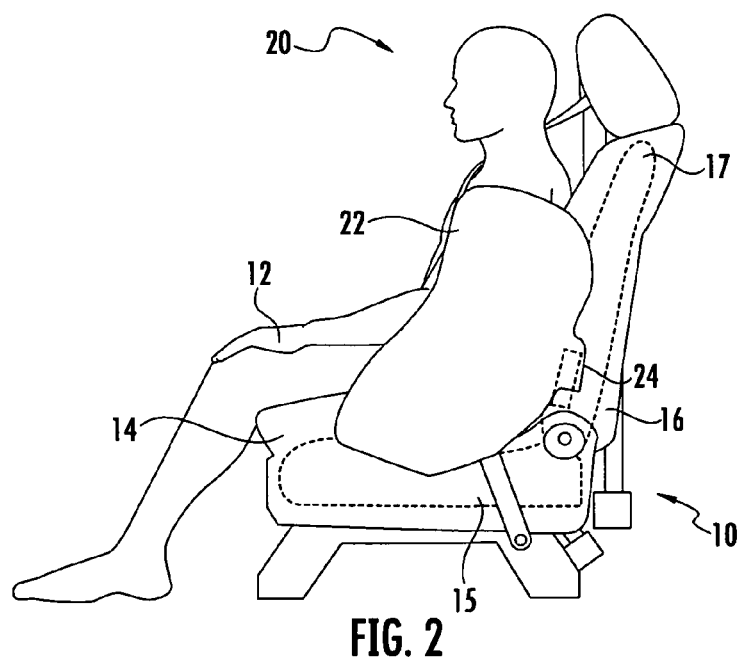
FIG. 2 is a schematic side view of a vehicle seat showing the side impact airbag module with a deployed airbag.

As shown in FIG. 2, the SAB module 20 according to an exemplary embodiment may include an inflatable airbag or cushion 22 and an inflator 24. The inflator 24 may be a pyrotechnic device or other airbag inflation device that is configured to generate gas at a high volumetric flow rate for the inflatable cushion 22. The SAB module 20 is provided within the seat back 16, under the trim cover. The SAB module 20 is coupled to the seat back frame 17 with a mounting device. In a side impact event involving the vehicle, the inflation gas provided by the inflator 24 fills the cushion 22, expanding the cushion 22 to deploy from the side bolster of the seat back 16 to a position along the side of the upper body and pelvis of the occupant 12 of the vehicle seat 10 and the door (or other exterior structure of the passenger compartment) of the vehicle. The airbag 22 may include a heat shield or component (e.g., a gas diffuser) to mitigate the exposure of the airbag 22 to inflation gas from the inflator 24.

The cushion 22 is generally formed from a plurality of panels that are coupled together by a plurality of seams. According to an exemplary embodiment, the panels are a nylon fabric. In other embodiments, the cushion 22 may be formed from any suitable fabric material. The panels may be sewn together or secured by other suitable methods such as thermobonding or gluing. The panels and the connecting seams may be coated with a sealant in order to reduce the leakage of inflation gas. The cushion 22 may be divided into two or more compartments (e.g., chambers, tubes, etc.). Passages or ports may be provided between individual compartments such that the compartments are in fluid communication with each other. The cushion 22 may also include a plurality of un-inflated portions such as un-inflated portions that generally separate the compartments.

Figure 6:
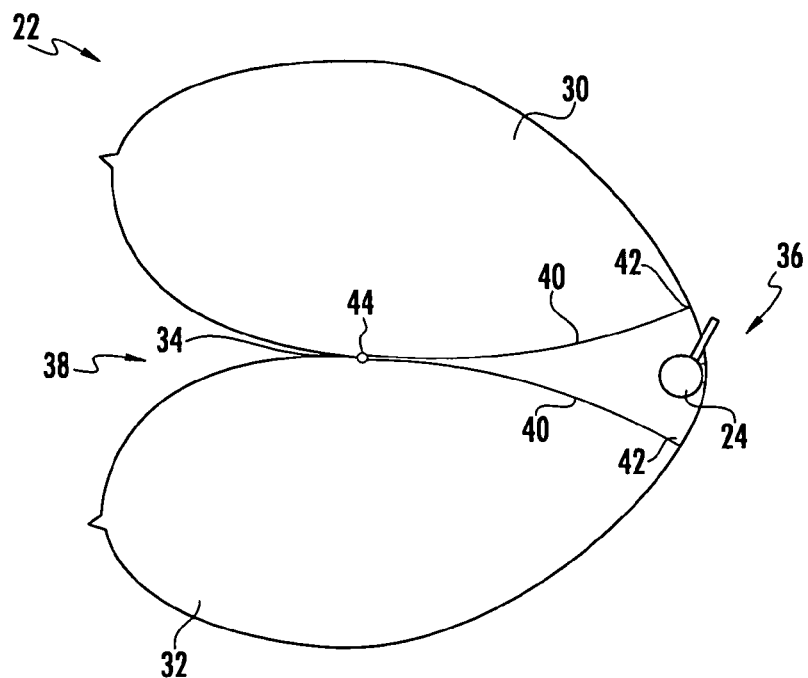
FIG. 6 is a top cross-section view of the airbag of FIG. 3, taken along line 6-6.

As shown in FIG. 6, the airbag or cushion 22 is shown to have an inboard lobe 30 and an outboard lobe 32. Each lobe may be formed by one or more inflatable chambers. The inboard lobe 30 is coupled to the outboard lobe 32 along a shared vertical seam 34 that extends between the lobes 30 and 32 along the base of the gap 38 proximate to the back or rear portion 36 of the airbag 22 and the inflator 24. The shared vertical seam 34 allows for initial fore/aft trajectory during deployment similar to the standard two dimensional (e.g., single lobed) side airbag. The lobes 30, 32 may be fluidly connected at a rear or aft portion of the cushion.

Forward of the back side 36 of the airbag, the inboard lobe 30 and the outboard lobe 32 extend away from each other, with an indentation or gap 38 formed between the inboard lobe 30 and the outboard lobe 32 along the center seam 34. The gap 38 creates an inboard half airbag and an outboard half airbag. The thickness of the cushion 22 therefore increases forward of the back side 36 as the cushion 22 deploys forward in the vehicle. The combined thickness of the lobes 30 and 32 controls the overall effective thickness of the cushion 22. The inboard lobe 30 and the outboard lobe 32 are configured to provide the cushion 22 with a relatively high loft (i.e., an increased cushion width and loading depth) to more effectively absorb energy between the occupant and the vehicle (e.g., trim) during a side impact. The lobes may be configured as separate half airbags that are not fluidly connected. For example, the airbag may include a center panel separating the lobes or the gap 38 may extend to the inflator. The inflator 24 may be configured to provide inflation gas separately to each of the lobes. Alternatively, as shown in the figures, the lobes may be configured as connected half airbags which are fluidly connected at an aft or rear portion of the cushion 22.

The inboard lobe 30 and the outboard lobe 32 are positioned relative to the occupant such that the occupant contacts and loads both the inboard lobe 30 and the outboard lobe 32 during a side impact event. Together, the lobes 30 and 32 provide an increased lateral resistance to the occupant compared to a single chamber type side airbag. The increased lateral resistance allows the two lobes 30 and 32 to be inflated to a lower pressure than a single chamber while, at the same time, maintaining similar or improved energy management during a side impact event. As the inboard lobe 30 is loaded by the occupant, it forces gas into the outboard lobe 32, thus creating a sustained resistance during a lateral impact with a lower reaction force to the occupant than a single chamber.

The gap 38 along the center of the cushion 22 between the lobes 30 and 32 provides a space to implement adaptive venting for better energy management during a dynamic event. Venting features including vent openings (e.g., flaps, apertures, slits, frangible portions, etc.) may be provided between the lobes 30 and 32, to allow gas to escape into the gap 38. The venting features can be opened or closed based upon the interaction of the two lobes 30 and 32 when loaded during a dynamic event to manage energy transferred to the airbag 22 by the occupant. For example, the venting features may be adaptive, passive features provided in the upper portions of the gap 38. A relatively small occupant (e.g., a 5% female) may contact the airbag 22 with the shoulder below this venting feature, allowing inflation gas to escape through the venting feature to lessen the reaction force between the occupant and the cushion. A relatively large occupant (e.g., a 95% male) may contact the airbag 22 with the shoulder at or above this venting feature, covering any vent opening and thereby closing the opening and limiting venting of the inflation gasses thereby increasing the reaction force between the occupant and the cushion.

Figure 7:
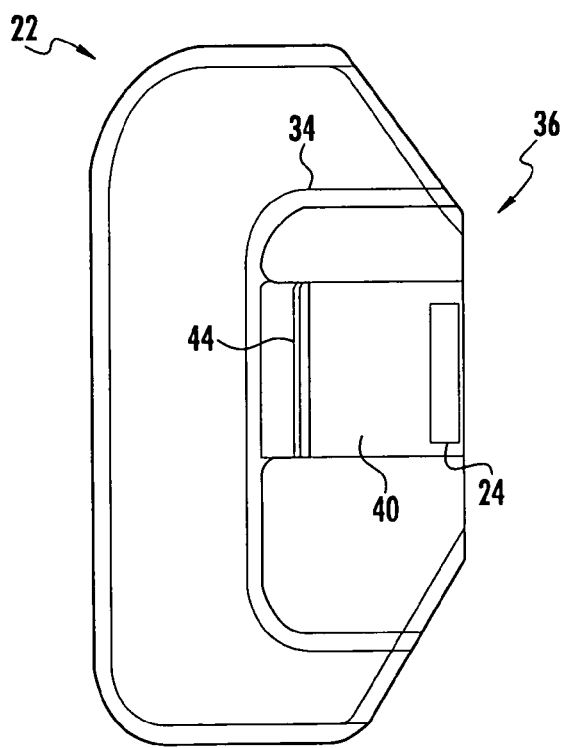
FIG. 7 is a side cross-section view of the airbag of FIG. 5, taken along line 7-7.

Referring to FIGS. 6-7, internal tethers 40 extend in the fore/aft direction and are coupled to the outer panels at internal seams 42 and 44. The internal tethers 40 control the position of the vertical central seam 34 during deployment.

The position of the internal seams 42 and 44 and the geometry of the internal tethers 40 can be adjusted to change shape and deployment characteristics of the airbag 22. The position of the seams 42 and 44 can also play a role in determining the overall loft of the cushion 22 by controlling the amount that the inboard lobe 30 and the outboard lobe 32 interact or spread apart upon deployment.

The separation of the cushion volume into the inboard lobe 30 and the outboard lobe 32 allows for a greater width of the cushion 22 in the lateral direction compared to a single chamber cushion with the same internal volume. The cushion 22 has an increased loft compared to a single chamber cushion without decreasing the fore/aft coverage of the cushion 22 and the restraint of the occupant.

Figure 8:
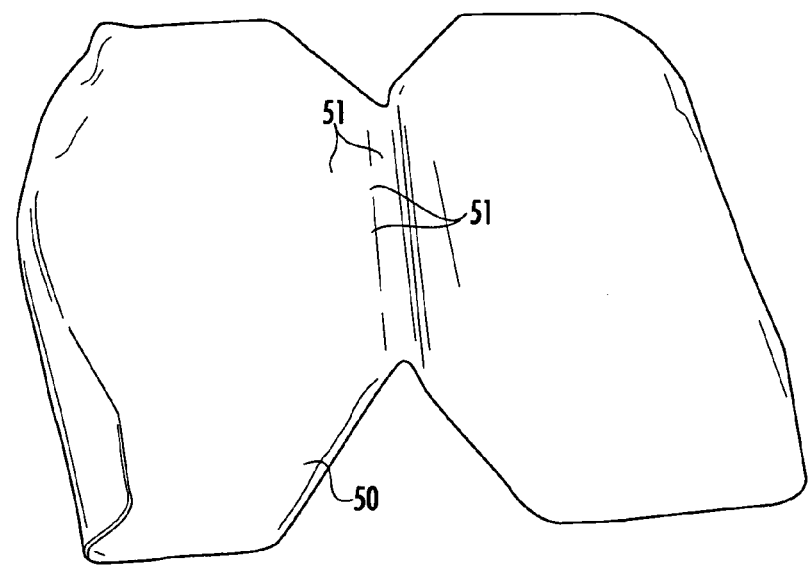
FIG. 8 is a perspective view of an exterior side of a main panel of an airbag.
Figure 14:
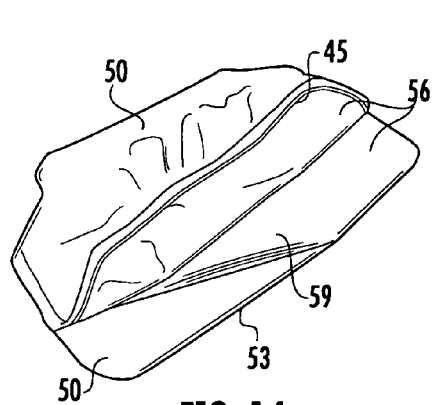
FIG. 14 is a perspective view showing the alignment of the central panels and main panel during assembly of the airbag.
Figure 15:
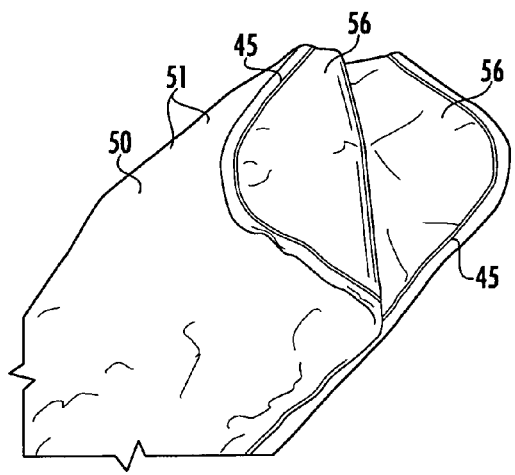
FIG. 15 is a perspective view showing the connected main and central panels with a portion of the airbag folded back to show both of the central panels.
Figure 16:
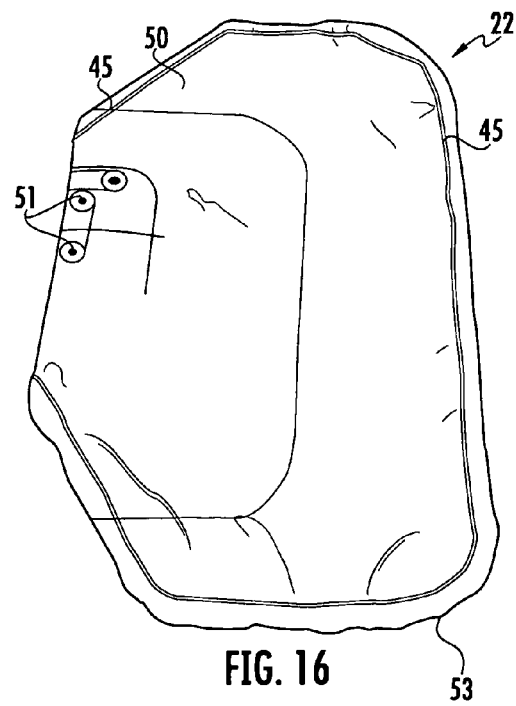
FIG. 16 is a perspective view of one exterior side of the airbag prior to folding for storage in the airbag module.

Referring now to FIGS. 8-16, the construction of the airbag 22 is shown according to an exemplary embodiment. The construction of the airbag 22 is configured to be relatively simple to allow for ease of manufacturing. The airbag 22 may be formed from a plurality of outer panels. A main panel 50 is shown in FIG. 8, and may form the outer face of both the inboard lobe 30 and the outboard lobe 32. In one exemplary embodiment, the main panel 50 may be a single fabric panel. In other embodiments, the main panel 50 may be formed from multiple panels (e.g., an inboard lobe panel and an outboard lobe panel). As shown in FIG. 16, openings 51 may be provided in the main panel 50 to allow fasteners utilized to mount the inflator 24 to pass through the main panel 50.

Figure 9:
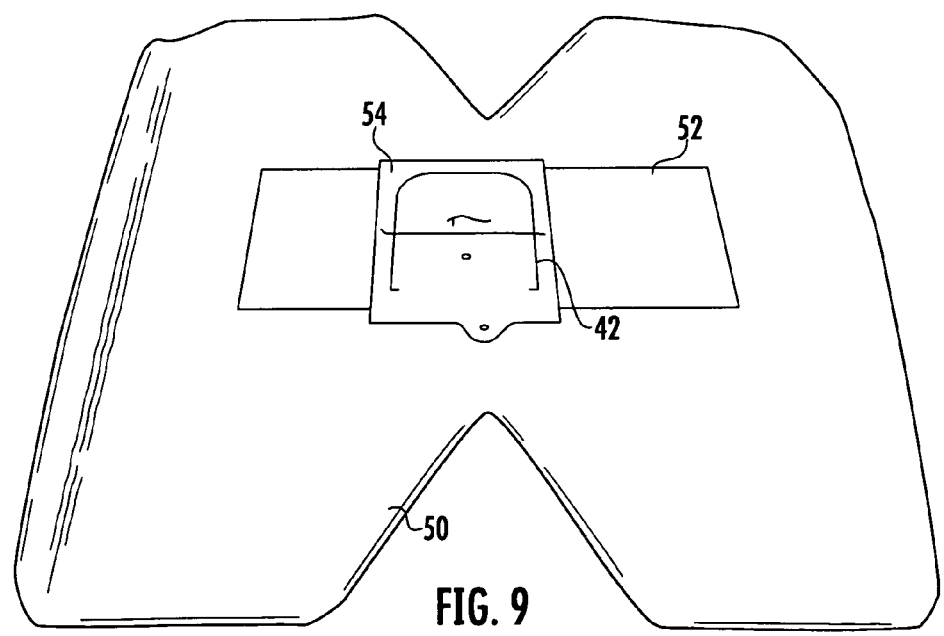
FIG. 9 is a perspective view of an interior side of the main panel shown in FIG. 8.

As shown in FIG. 9, an internal tether panel 52 and an inflator reinforcement panel 54 may be connected to the main panel 50 at seam 42. The internal tether panel 52 and the inflator reinforcement panel 54 may each be formed from a single panel, as shown, or may be formed from multiple panels.

Figure 10:
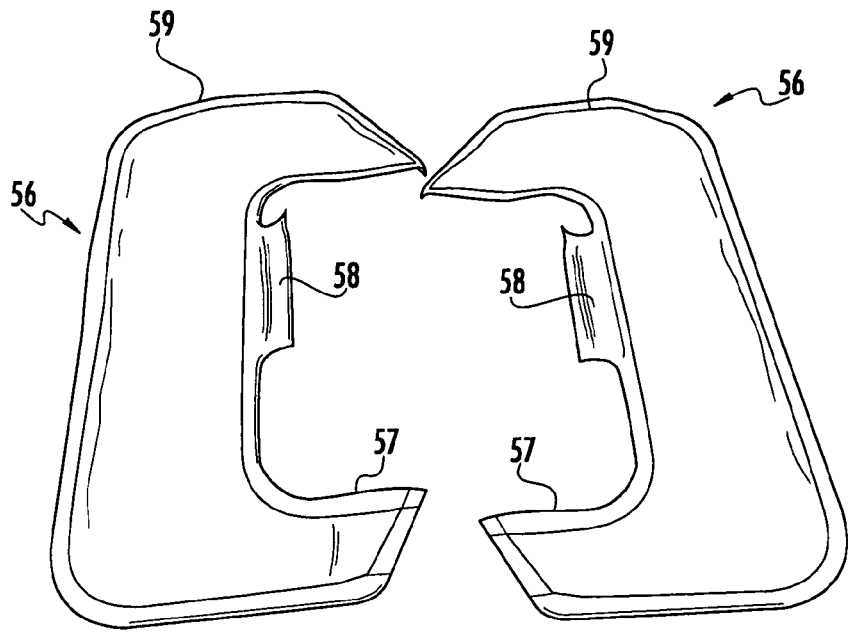
FIG. 10 is a perspective view of a pair of central panels of the airbag prior to assembly of the airbag.
Figure 11:
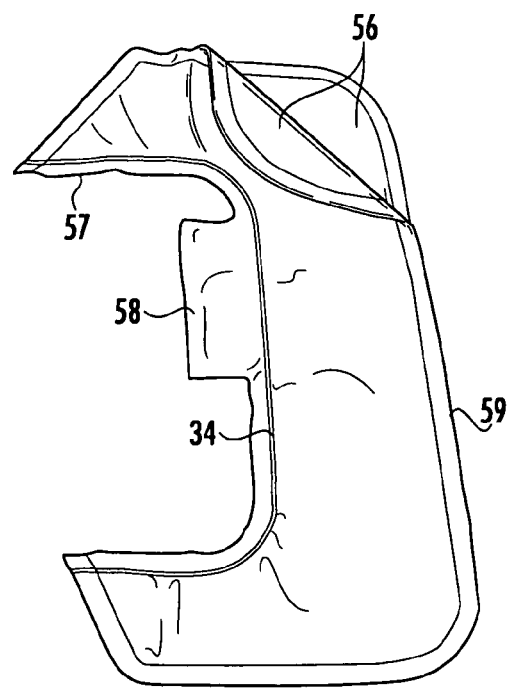
FIG. 11 is a perspective of view of the central panels of the airbag after the panels are connected along a central seam.
Figure 12:
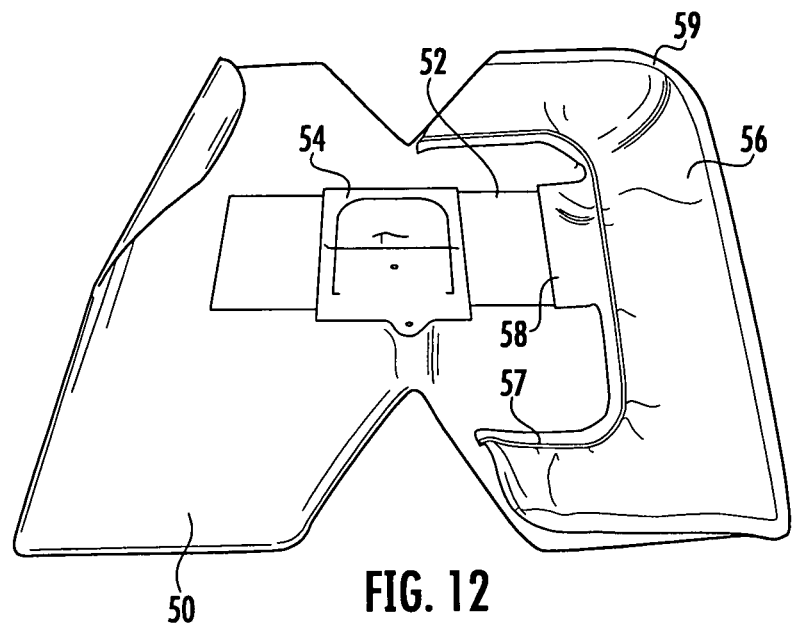
FIG. 12 is a perspective view showing the main and central panels of FIGS. 9 and 11 prior to connection of the panels.
Figure 13:
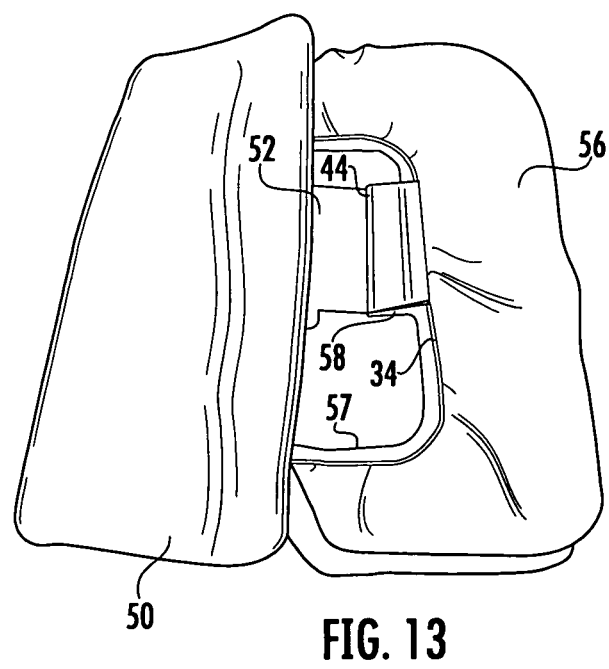
FIG. 13 is a perspective view of the main and central panels shown in FIG. 12 during the assembly step of connecting the panels together.

The outer panels of the airbag 22 may include a pair of center panels 56 that are connected together to form the inner faces of the lobes. The center panels are shown to be C-shaped, but the configuration of the panels may be varied to accommodate a particular vehicle or loading requirement, for example. As an alternative, the center panels 56 may be formed by a single central panel that is tethered or anchored to form the base of the gap 38. As shown in FIG. 10, the center panels 56 include an inwardly extending flap 58. As shown in FIG. 11, the inner edges 57 of the center panels 56 may be sewn together to form a portion of the central seam 34. The edges of the internal tether 52 may be aligned with each of the flaps 58 and are sewn together at seam 44, as shown in FIGS. 12 and 13. The outer edges 59 of the center panels 56 and outer edges 53 of the main panel 50 are sewn together to close the forward portion of the cushion 22 at a peripheral seam 45, as shown in FIGS. 14 and 15. The outer edges 59 of the center panels 56 and the outer edges 53 of the main panel 50 are then sewn together to continue the seams 45 along the top portion and the bottom portion of the cushion 22 and close the airbag 22.

Figure 17:
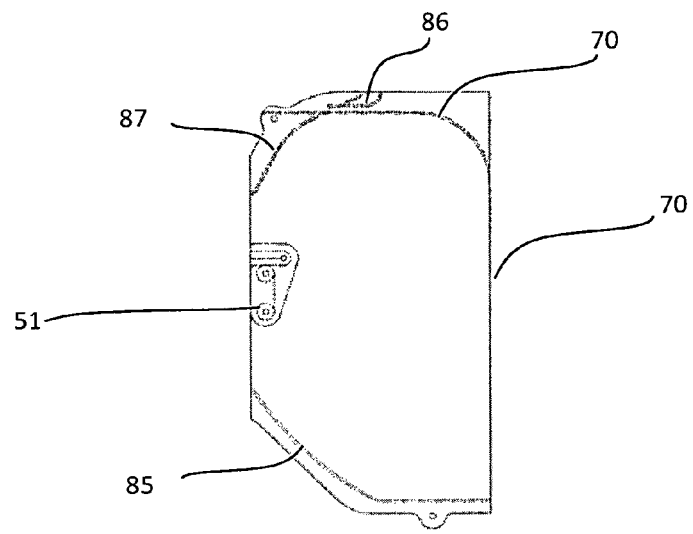
FIG. 17 is a side view of an assembled one piece airbag according to an alternative embodiment.
Figure 18:
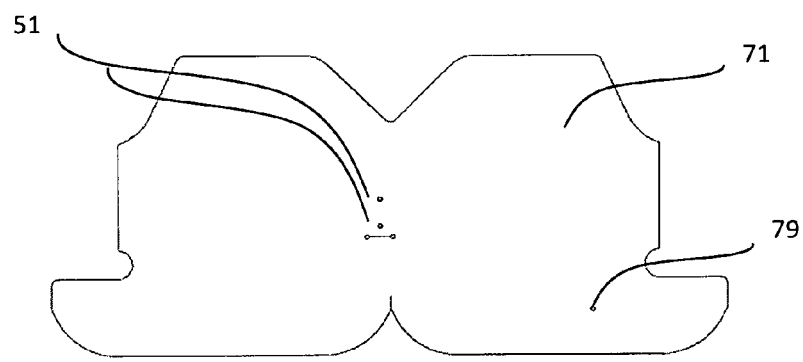
FIG. 18 is a plan view of the exterior side of the main panel of the airbag of FIG. 17.
Figure 19:
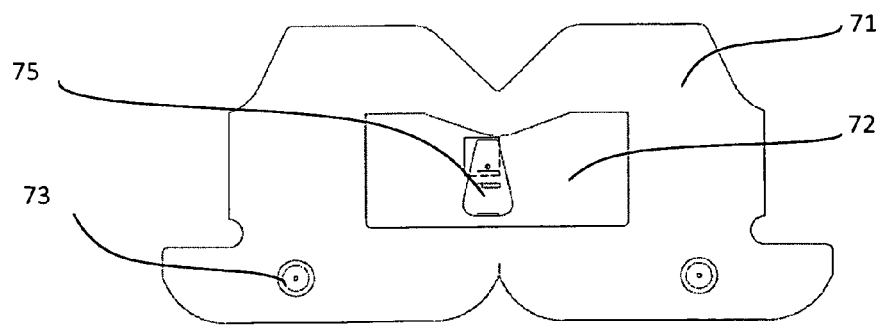
FIG. 19 is a plan view of the interior side of the main panel of the airbag of FIG. 17.

FIGS. 17-23 show another embodiment of an airbag for use in a side airbag module. The airbag 70 shown in FIGS. 17-23 includes two lobes 76, 78 and functions in the same manner as the airbag described above. The airbag 70 shown in FIG. 17 is a one piece airbag. The airbag is formed from a single main panel 71. The panel may include one or more vent openings 79 to allow inflation gas to escape from the airbag after inflation. As shown in FIG. 19, the vent openings may be reinforced by a patch 73. The panel 71 may include openings 51 to allow the inflator to be positioned inside the airbag and connected to a retainer outside the airbag.

Figure 20:
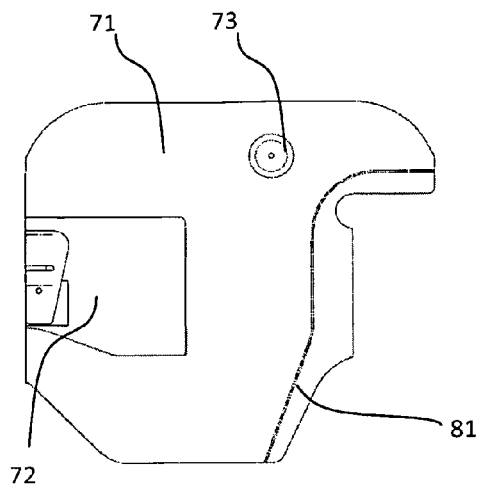
FIG. 20 is a plan view of the interior side of the main panel of the airbag of FIG. 17 during the manufacturing process.
Figure 21:
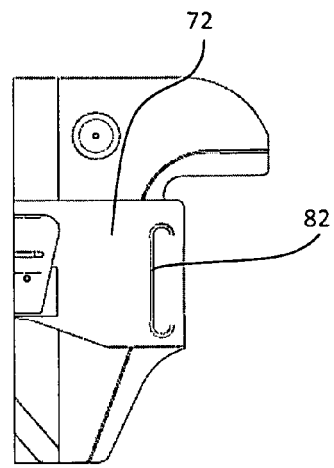
FIG. 21 is a plan view of the interior side of the main panel of the airbag of FIG. 17 during the manufacturing process after the tether is connected to the panel.

As shown in FIG. 19, the airbag 71 may include an internal tether 72. Although shown as a single panel 72, the tether may be formed by two separate panels. The tether 72 extends so that ends of the tether connect to the airbag at the base of the gap 77 between the lobes of the cushion. An intermediate portion of the tether 72 may be connected to the main panel proximate to the inflator. The airbag may also include patches to support the main panel in the area whether the inflator connects to the main panel and the retainer. In addition, a heat shield 75 may be provided adjacent the inflator. FIGS. 20-23 show the assembly of the airbag, which is assembled in an "inside out" configuration as shown in FIGS. 20 and 21. The main panel is folded over and perimeter portions are connected together along a perimeter seam 81 as shown in FIG. 20. The panel is then folded (e.g., rolled) or bunched together to allow the ends of the tether 72 to be connected to the panel by a partially oval shaped seam 82. The seam passes through four layers of fabric (i.e., the tether 72 and the main panel 71).

Figure 22:
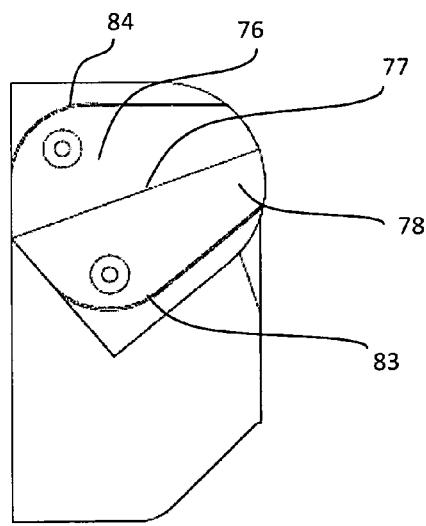
FIG. 22 is a plan view of the exterior side of the main panel of the airbag of FIG. 17 during the manufacturing process showing the gap between the inboard and outboard lobes of the airbag.
Figure 23:
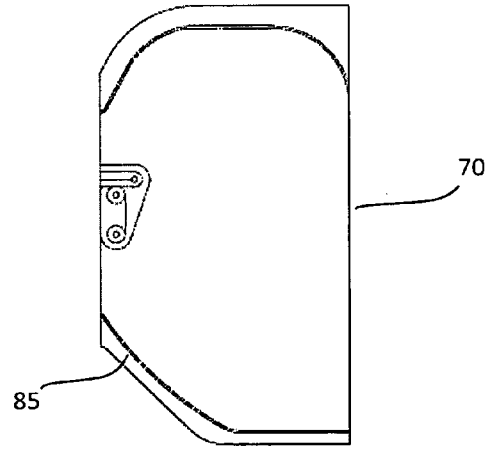
FIG. 23 is a plan view of the exterior side of the main panel of the airbag of FIG. 17 during the manufacturing process.

As shown in FIG. 22, during manufacture, the airbag is turned to a normal position and the perimeters of the two lobes 76, 78 are closed by a seam 83, 84. For final assembly of the airbag, the main panel is connected together by three additional seams 85, 86, 87 as shown in FIGS. 17 and 23. The resulting airbag is a one-piece two lobe airbag that functions in essentially the same manner as the embodiment described above.

Many variations of the above embodiments are possible to adjust various aspects of the deployment of the airbag and the properties of the inflated airbag The loft of the airbag can be adjusted and tailored to meet energy management needs without sacrificing fore/aft coverage. Likewise, the fore/aft coverage of the airbag can easily be adjusted and tailored to meet energy management needs without sacrificing cushion loft. For example, the lateral width or loft of the airbag may be adjusted by varying the position of the central vertical seam, the size of the internal tethers, and the depth of the gap between the lobes. In some embodiments, the bottom and/or the top edges of lobes may be coupled together to accommodate vehicle platforms with reduced clearance.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle seat, comprising:
    an inflatable airbag;
    an inflator configured to produce inflation gas for inflating the airbag;
    wherein the airbag is stored in the vehicle seat prior to deployment;
    wherein the airbag includes inboard and outboard inflatable chambers separated by a gap at a forward portion of the airbag;
    wherein the airbag is configured to deploy into a position along a side of the vehicle seat and the occupant;
    wherein the airbag includes a single main panel forming the boundary of the inboard and outboard inflatable chambers, and wherein the main panel includes projecting wing portions that form the sides of the gap when the airbag is assembled; and
    wherein the main panel includes symmetrical portions forming an outer face of the inboard and outboard chambers and the aft portion of the airbag.

2. The airbag module of claim 1, wherein the inboard and outboard chambers are fluidly connected at the aft portion of the airbag.

3. The airbag module of claim 1, wherein the airbag includes a pair of internal tethers; and wherein each of the tethers is positioned to extend from the aft portion of the airbag to the portion of the main panel forming the outer face of one of the inboard and outboard chambers.

4. The airbag module of claim 3, wherein the internal tethers are formed by a single fabric panel.

5. An occupant protection apparatus for protecting an occupant of a passenger compartment of a vehicle from a side impact involving the vehicle, the apparatus comprising an inflator and an airbag, wherein the airbag includes inboard and outboard inflatable chambers separated by a gap; and
    wherein the airbag is configured to deploy forwardly into a position between the occupant and an interior side of the passenger compartment of the vehicle; and
    wherein the airbag is formed by a single main panel that is folded to form symmetrical half portions and wherein each of the half portions includes a wing portion that projects outwardly from a perimeter of the panel and wherein when the airbag is assembled each wing portion forms a side of the gap.

6. The occupant protection apparatus of claim 5, wherein the airbag includes a pair of internal tethers that extend from a rear portion of the airbag toward the inboard and outboard inflatable chambers.

7. The occupant protection apparatus of claim 6, wherein the tethers are formed by a single fabric panel.

8. The occupant protection apparatus of claim 5, wherein the airbag includes at least one vent opening located in one of the inboard and outboard chambers, wherein the vent opening is positioned to allow inflation gas produced by the inflator to escape through the vent opening into the gap.

9. The occupant protection apparatus of claim 5, wherein perimeter portions of the main panel are connected together.

10. The occupant protection apparatus of claim 9, further comprising a tether panel that is positioned in the interior of the airbag and extends to the perimeter of the main panel at the base of the gap.

11. The occupant protection apparatus of claim 10, wherein the tether panel includes two ends and wherein both ends of the tether panel are connected to the perimeter of the main panel at the base of the gap.

12. The occupant protection apparatus of claim 11, wherein an intermediate portion of the tether panel is connected to the main panel approximate the inflator.

13. The occupant protection apparatus of claim 5, wherein the airbag includes at least one vent opening located in a wing portion.

14. The occupant protection apparatus of claim 13, wherein each lobe of the airbag includes a vent opening located in facing surfaces of the main panel so that air escaping the airbag through the vent openings enters the gap between the lobes.

15. The occupant protection apparatus of claim 5, wherein each of the wing portions is folded inwardly and connected to a corresponding wing portion located in the other half portion to thereby form the gap.

16. An airbag module for protecting an occupant of a vehicle seat, comprising:
    an airbag including an inner lobe and an outer lobe separated by a gap;
    an inflator for providing gas to inflate the airbag;
    wherein the airbag includes an internal tether extending from a position proximate the inflator to the base of the gap;
    and wherein the exterior of the airbag including the inner and outer lobes is formed by a single panel; and
    wherein the airbag is formed by a single main panel that is folded to form symmetrical half portions and wherein each of the half portions include a projecting wing portion that forms a side of the gap so that the volume of the inner and outer lobes are approximately the same when the airbag is fully inflated.

17. The airbag module of claim 16, wherein the tether is formed by a single panel including two ends and wherein both ends of the tether are connected to the perimeter of the main panel at the base of the gap and wherein an intermediate portion of the tether is connected to the main panel approximate the inflator.

\* \* \* \* \*